United States Patent
Ramirez Sanchez et al.

(10) Patent No.: US 11,499,524 B2
(45) Date of Patent: Nov. 15, 2022

(54) SYSTEM AND METHOD FOR CONTROLLING LOW-SPEED OPERATIONS OF A WIND TURBINE

(71) Applicant: General Electric Company, Schenectady, NY (US)

(72) Inventors: Fernando Arturo Ramirez Sanchez, Salem, VA (US); Igor Berroteran, Salem, VA (US); Cornelius Edward Holliday, III, Forest, VA (US); David Scott Wilmer, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/177,287

(22) Filed: Feb. 17, 2021

(65) Prior Publication Data
US 2022/0263319 A1 Aug. 18, 2022

(51) Int. Cl.
H02J 3/00 (2006.01)
F03D 7/02 (2006.01)
H02J 3/18 (2006.01)

(52) U.S. Cl.
CPC .............. *F03D 7/0284* (2013.01); *H02J 3/18* (2013.01); *F05B 2220/706* (2013.01); *F05B 2240/21* (2013.01); *H02J 2300/28* (2020.01)

(58) Field of Classification Search
CPC .......... H02J 3/381; H02J 3/18; H02J 2300/28; F03D 7/0284; F05B 2220/706; F05B 2240/21
See application file for complete search history.

(56) References Cited

U.S. PATENT DOCUMENTS

| | | |
|---|---|---|
| 5,289,041 A | 2/1994 | Holley |
| 8,198,742 B2 | 6/2012 | Jergensen et al. |
| 8,436,490 B2 | 5/2013 | Gertmar et al. |
| 9,556,852 B2 | 1/2017 | Babazadeh et al. |
| 9,998,030 B2 | 6/2018 | Wei et al. |
| 10,502,185 B2 | 12/2019 | Beekmann et al. |
| 10,767,630 B1 | 9/2020 | Venkitanarayanan et al. |
| 2008/0093855 A1 | 4/2008 | Walling |

(Continued)

FOREIGN PATENT DOCUMENTS

| | | |
|---|---|---|
| CN | 102852726 B | 5/2014 |
| EP | 2879280 A1 | 6/2015 |

(Continued)

OTHER PUBLICATIONS

European Search Report for EP application No. 22153449,8, dated Aug. 1, 2022.

*Primary Examiner* — Julio C. Gonzalez
(74) *Attorney, Agent, or Firm* — Dority & Manning, P.A.

(57) ABSTRACT

A system and method are provided for controlling low-speed operations of a wind turbine electrically coupled to an electrical grid. The wind turbine includes a generator and a power converter. The generator includes a generator rotor and a generator stator. An operating parameter of the generator rotor is indicative of a low-speed operation of the generator. Accordingly, the crossing of a first threshold by the operating parameter is detected. In response, at least a portion of a required reactive power generation is developed via the generator rotor. The portion is then delivered to the electrical grid via the grid side of the power converter.

16 Claims, 5 Drawing Sheets

(56) References Cited

U.S. PATENT DOCUMENTS

| | | | |
|---|---|---|---|
| 2013/0169241 A1* | 7/2013 | García Sayes | H02P 9/48 |
| | | | 322/20 |
| 2016/0177923 A1 | 6/2016 | Edenfeld | |
| 2017/0314534 A1* | 11/2017 | Gupta | H02J 3/381 |
| 2018/0171976 A1* | 6/2018 | Tan | H02P 9/007 |
| 2020/0274360 A1 | 8/2020 | Bins et al. | |
| 2020/0392942 A1* | 12/2020 | Andersen | H02P 29/68 |

FOREIGN PATENT DOCUMENTS

| | | |
|---|---|---|
| EP | 3518368 A1 | 7/2019 |
| WO | WO2016139145 A1 | 9/2016 |
| WO | WO2017000950 A1 | 1/2017 |

\* cited by examiner

SYSTEM AND METHOD FOR CONTROLLING LOW-SPEED OPERATIONS OF A WIND TURBINE

FIELD

The present disclosure relates in general to wind turbines, and more particularly to systems and methods for controlling wind turbines during low-speed operations.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to an electrical grid. Modern wind power generation systems typically take the form of a wind farm having multiple such wind turbine generators that are operable to supply power to a transmission system providing power to the electrical grid.

Some wind turbine configurations include double-fed induction generators (DFIGs). Whenever DFIGs are employed to generate the output of the wind turbine, slip may be encountered. Generally, slip may be the difference between the operating speed and the synchronous speed of the DFIG (divided by the synchronous speed). The operating speed is typically the rotational speed of a generator rotor and the synchronous speed is typically a rotational speed of the magnetic field of the generator stator. The synchronous speed may correspond to an operating frequency of the electrical grid.

The slowing of the generator rotor, for example in response to a decrease in wind velocity, may result in increased slip. Increased slip may, in turn, result in increased generator rotor voltage. Thus, during low-wind speed operations, the DFIG may operate with a high degree of slip and corresponding high rotor voltage. Operating under such conditions may reduce an expected lifecycle of various components of the electrical system of the wind turbine and/or result in a reduction of an operational envelope of the wind turbine.

Thus, the art is continuously seeking new and improved systems and methods that address the aforementioned issues. As such, the present disclosure is directed to systems and methods for controlling low-speed operations of the wind turbine.

BRIEF DESCRIPTION

Aspects and advantages of the invention will be set forth in part in the following description, or may be obvious from the description, or may be learned through practice of the invention.

In one aspect, the present disclosure is directed to a method for controlling low-speed operations of the wind turbine electrically coupled to an electrical grid. The wind turbine may include a generator and a power converter. The generator may have a generator rotor and a generator stator. The method may include detecting, via a controller, a crossing of a first threshold by an operating parameter of the generator rotor. The operating parameter may be indicative of a low-speed operation of the generator. In response to the operating parameter crossing the first threshold, the method may include developing at least a portion of a required reactive power generation via the generator rotor. Additionally, the method may include delivering the portion of the required reactive power generation to the electrical grid via a grid side of the power converter.

In an embodiment, developing the portion of the required reactive power generation may include receiving, via the controller, a reactive-current setpoint for the generator. The reactive-current setpoint may correspond to a current for the generator rotor which facilitates the satisfaction of the required reactive power generation via the generator stator. Additionally, the method may include developing, via the controller, a modified reactive-current setpoint configured to facilitate generation of the portion of the required reactive power generation via the generator rotor. Further, the method may include changing at least one operating state of the converter based on the modified reactive-current setpoint.

In an additional embodiment, the portion of the required reactive power generation may be a first reactive power portion of the required reactive power generation. Additionally, changing the operating state(s) of the converter may facilitate the satisfaction of the required reactive power generation via a reactive power output of the wind turbine. The reactive power output may include the first reactive power portion delivered to the electrical grid via the grid side of the power converter and a second reactive power portion delivered to the electrical grid via a bypassing of the power converter.

In a further embodiment, changing the operating state(s) of the converter may facilitate the satisfaction of an entirety of the required reactive power generation via the portion of the required reactive power generation delivered to the electrical grid via the grid side of the power converter.

In yet a further embodiment, the operating parameter of the generator rotor may be a generator rotor voltage magnitude. Additionally, the first threshold may be a generator rotor voltage threshold magnitude indicative of the low-speed operation of the generator. Further, detecting the approach of the operating parameter of the generator rotor to the first threshold may include receiving, via the controller, data indicative of the generator rotor voltage magnitude.

In an embodiment, receiving data indicative of the generator rotor voltage magnitude may include determining, via the controller, a converter modulation index for a rotor-side converter of the power converter indicative of the generator rotor voltage magnitude.

In an additional embodiment, receiving data indicative of the generator rotor voltage magnitude may include determining, via the controller, a DC link voltage for a DC link of the power converter indicative of the generator rotor voltage magnitude.

In a further embodiment, the operating parameter of the generator rotor may be a generator rotor rotational speed. Additionally, the first threshold may be a generator rotor rotational speed threshold. Further, a low-speed operation of the generator may be indicated when the generator rotor rotational speed is at or below the generator rotor rotational speed threshold.

In yet a further embodiment, delivering the portion of the required reactive power generation to the electrical grid via the grid side of the power converter may facilitate the reduction of a generator rotor voltage magnitude.

In an embodiment, the reduction of the generator rotor voltage magnitude may facilitate a reduction of a thermal load and/or an electrical load across a component of the power converter.

In an additional embodiment, following the delivery of the portion of the required reactive power generation to the electrical grid via the grid side of the power converter, the method may also include detecting, via the controller, a crossing of a second threshold by the operating parameter of the generator rotor. The method may also include reducing, via the controller, an active power setpoint and/or a reactive power setpoint for the generator in response to the approach of the operating parameter to the second threshold.

In a further embodiment, the second threshold may be based on a projected reliability of at least one component of the power converter.

In yet a further embodiment, the wind turbine may also include a rotor having one or more rotor blades mounted thereto. The rotor may be rotatably coupled to the generator. Additionally, reducing the active power setpoint and/or the reactive power setpoint for the generator may facilitate an increase in an inertia of the rotor of the wind turbine.

In another aspect, the present disclosure is directed to a system for controlling a wind turbine coupled to an electrical grid. The wind turbine may include a generator and a power converter. The generator may include a generator rotor and a generator stator. The system may include a controller communicatively coupled to the generator. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling low-speed operations of a wind turbine. Low-speed operations may be encountered when the environmental conditions acting on the wind turbine results in a relatively low rotational velocity of the wind turbine rotor and the rotatably connected generator rotor. For example, when coupled to a 50 Hz electrical grid, low-speed operations may include any operation of the wind turbine resulting in a rotational velocity of the generator rotor which is less than or equal to 1100 rotations per minute (RPM). When coupled to a 60 Hz electrical grid, low-speed operations may be encountered when the rotational velocity of the generator rotor is less than or equal to 900 RPM.

For wind turbines equipped with a DFIG, the rotational speed of the magnetic field of the generator stator may correspond to the operating frequency of the electrical grid (e.g. 50 or 60 Hz). However, the rotational speed of the generator rotor may be dependent on the environmental conditions and/or control settings of the wind turbine.

Accordingly, as the wind speed decreases and the generator rotor slows, the slip of the generator may increase. In order to maintain the operation of the DFIG, the increase in slip may necessitate an increase in the generator rotor voltage. The increase in generator rotor voltage may result in an increased load across various components of the power converter of the wind turbine and may, thus, result in increased wear of the components.

Additionally, grid authorities may levy a reactive power generation requirement equal to the full, rated reactive power capability of the wind turbine anytime the power generation is greater than a minimum power threshold. In other words, the grid authorities may require the full, rated reactive power capability of the wind turbine regardless of whether the environmental conditions support a minimum power generation or a maximum power generation. This reactive power generation requirement is typically satisfied via reactive power delivered via the generator stator directly to the electrical grid via the transformer of the wind turbine. This additional generation requirement, even during low-speed operations, may result in further increases in the generator rotor voltage. As such, the systems and methods disclosed herein may facilitate the satisfaction of the reactive power generation requirement without increasing the rotor voltage. In fact, the utilization of the systems and methods disclosed herein may result in a reduction of the rotor voltage at a given generator rotor speed relative to rotor voltages which may be obtainable without the utilization of the systems and methods.

In order to reduce the rotor voltage, and thus the load across various components of the power converter, the systems disclosed herein may detect when an operating parameter of the generator rotor crosses (e.g. "exceeds" or "falls below" depending on the nature of the operating parameter) a first threshold indicative of a low-speed operation of the generator. In response to the detection of the low-speed operation, the system may modify at least one setpoint of the converter in order to satisfy at least a portion of the required reactive power generation via reactive power developed by the generator rotor instead of the generator stator. This portion of the required reactive power generation may then be delivered to the electrical grid via the grid side of the power converter.

By delivering at least a portion of the reactive power generation requirement via the grid side of the power converter, the rotor voltage and corresponding load(s) across the various components of the power converter may be reduced. Accordingly, the operating envelope of the wind turbine may be expanded so that the power production may be continued at lower wind speeds without undue damage to the components of the wind turbine.

It should be appreciated that the utilization of the systems and methods disclosed herein may decrease reactive power flow through the generator in order to reduce rotor voltage. This may, in turn, improve converter reliability when operating in a low-speed region of the wind turbine operating envelope. Additionally, lowering the rotor voltages may also allow converter operation in lower speed ranges, which may translate into increased power production for the wind turbine.

Figure 1:
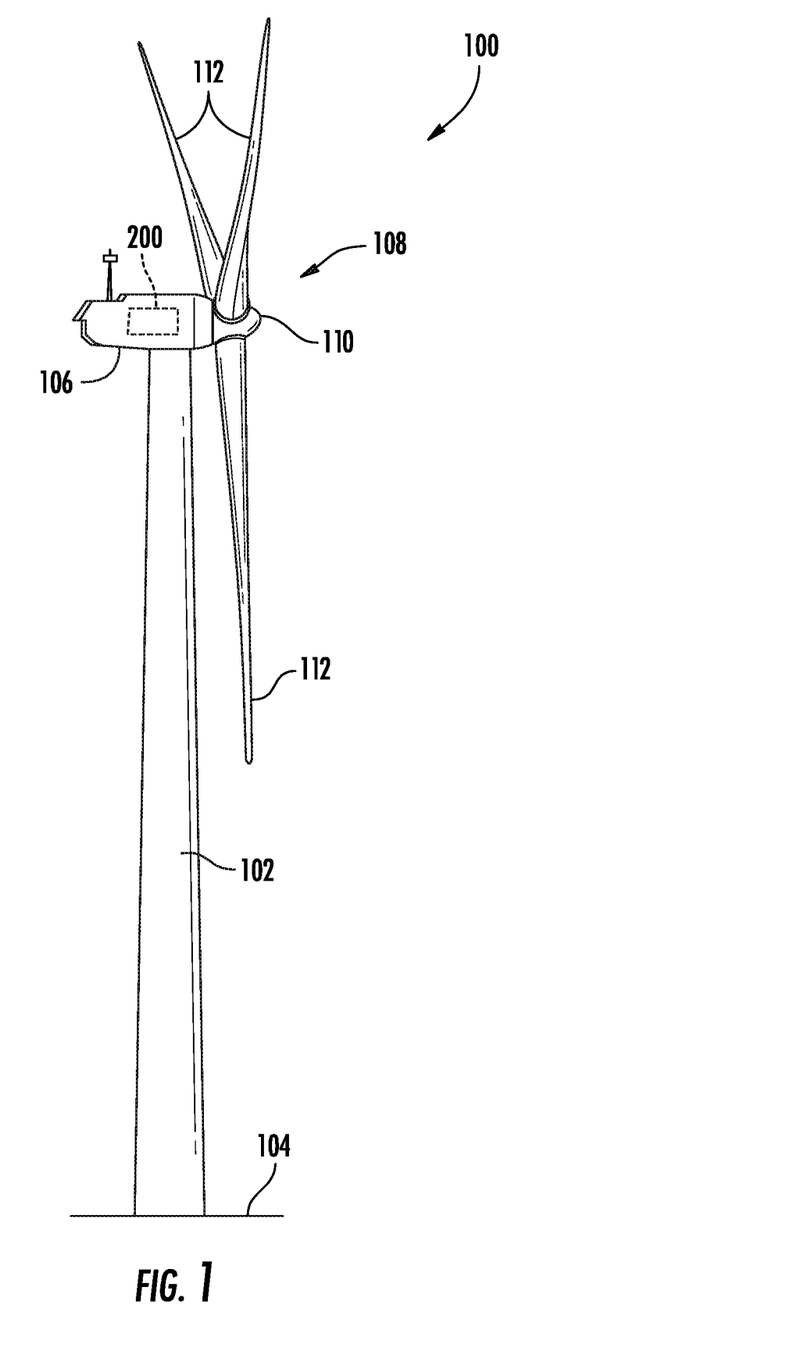
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. The wind turbine 100 may generally include a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 400 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
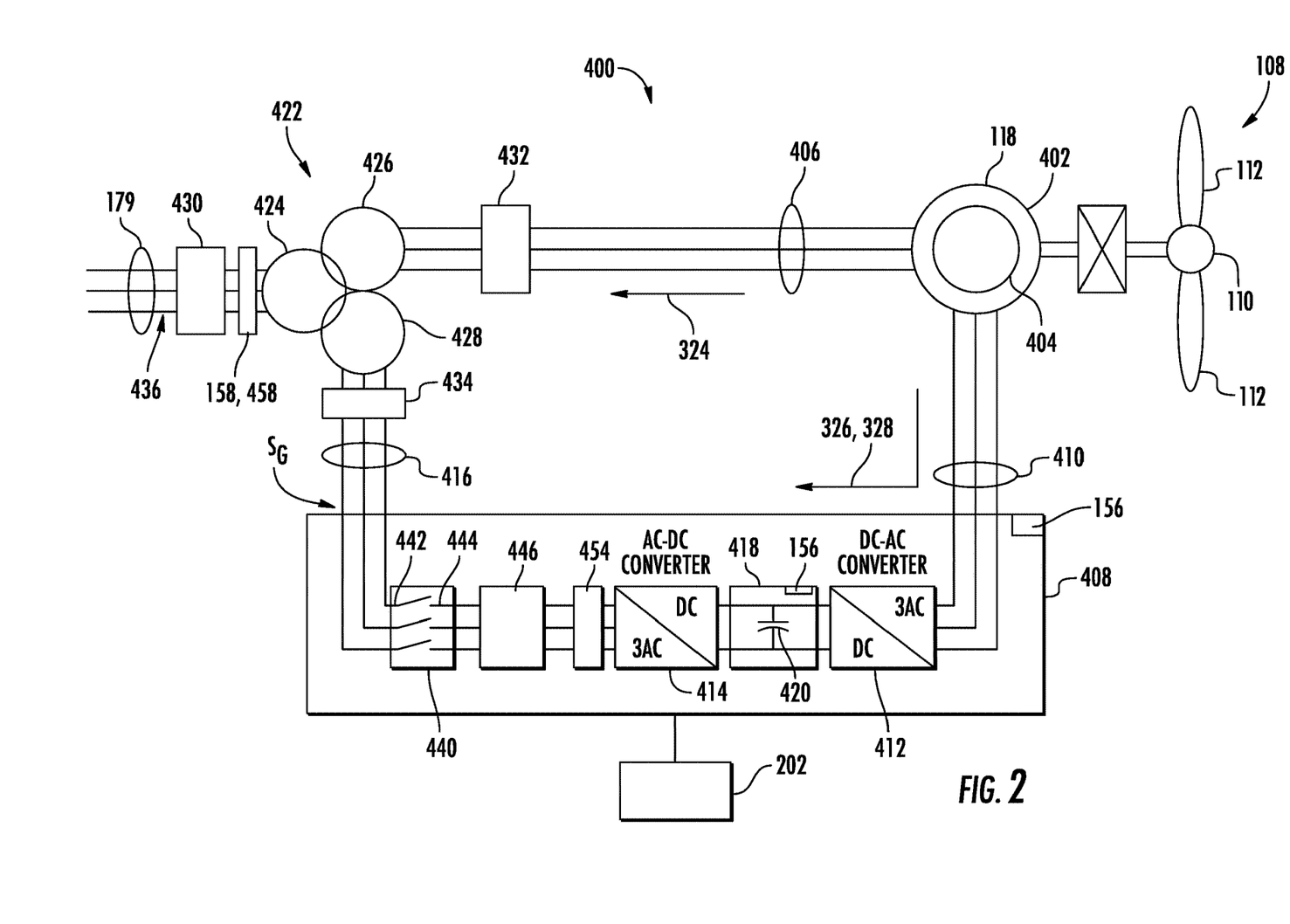
FIG. 2 illustrates a schematic diagram of one embodiment of an electrical system for use with the wind turbine according to the present disclosure.

Referring now to FIG. 2 wherein an exemplary electrical system 400 of the wind turbine 100 is illustrated. As shown, the generator 118 may be coupled to the rotor 108 for producing electrical power from the rotational energy generated by the rotor 108. Accordingly, in an embodiment, the electrical system 400 may include various components for converting the kinetic energy of the rotor 108 into an electrical output in an acceptable form to a connected electrical grid 179. For example, in an embodiment, the generator 118 may be a DFIG having a generator stator 402 and a generator rotor 404. The generator 118 may be coupled to a stator bus 406 and a power converter 408 via a rotor bus 410. In such a configuration, the stator bus 406 may provide an output multiphase power (e.g. three-phase power) from a stator of the generator 118, and the rotor bus 410 may provide an output multiphase power (e.g. three-phase power) of the generator rotor 404 of the generator 118. Additionally, the generator 118 may be coupled via the rotor bus 410 to a rotor side converter 412. The rotor side converter 412 may be coupled to a line-side converter 414 which, in turn, may be coupled to a line-side bus 416.

In an embodiment, the rotor side converter 412 and the line-side converter 414 may be configured for normal operating mode in a three-phase, pulse width modulation (PWM) arrangement using insulated gate bipolar transistors (IGBTs) as switching devices 438. Other suitable switching devices may be used, such as insulated gate commuted thyristors, MOSFETs, bipolar transistors, silicone controlled rectifier's, and/or other suitable switching devices. The rotor side converter 412 and the line-side converter 414 may be coupled via a DC link 418 across a DC link capacitor 420. For example, in an embodiment in accordance with the present disclosure, the line-side converter 414 may include three pairs of IGBTs and three corresponding pairs of diodes which may be employed to transform a DC input into an AC output having a desired phase angle.

In an embodiment, the power converter 408 may be coupled to the controller 200 configured as a converter controller 202 to control the operation of the power converter 408. For example, the converter controller 202 may send control commands to the rotor side converter 412 and the line-side converter 414 to control the modulation of switching elements used in the power converter 408 to establish a desired generator torque setpoint, active power output and/or reactive power output.

As further depicted in FIG. 2, the electrical system 400 may, in an embodiment, include a transformer 422 coupling the wind turbine of 100 to the electrical grid 179 via a point of interconnect (POI) 436. The transformer 422 may, in an embodiment, be a 3-winding transformer which includes a high voltage (e.g. greater than 12 KVAC) primary winding 424. The high voltage primary winding 424 may be coupled to the electrical grid 179. The transformer 422 may also include a medium voltage (e.g. 6 KVAC) secondary winding 426 coupled to the stator bus 406 and a low voltage (e.g. 575 VAC, 690 VAC, etc.) auxiliary winding 428 coupled to the line-side bus 416. It should be appreciated that the transformer 422 can be a three-winding transformer as depicted, or alternatively, may be a two-winding transformer having only a primary winding 424 and a secondary winding 426; may be a four-winding transformer having a primary winding 424, a secondary winding 426, and auxiliary winding 428, and an additional auxiliary winding; or may have any other suitable number of windings.

In an embodiment, the electrical system 400 may include various protective features (e.g. circuit breakers, fuses, contactors, and other devices) to control and/or protect the various components of the electrical system 400. For example, the electrical system 400 may, in an embodiment, include a grid circuit breaker 430, a stator bus circuit breaker 432, and/or a line-side bus circuit breaker 434. The circuit breaker(s) 430, 432, 434 of the electrical system 400 may connect or disconnect corresponding components of the electrical system 400 when a condition of the electrical system 400 approaches a threshold (e.g. a current threshold and/or an operational threshold) of the electrical system 400.

In an embodiment, the line-side converter 414 of the power converter 408 may be coupled to the electrical grid 179 via a converter contactor 440. The converter contactor 440 may have an open operating state/configuration, wherein the converter contactor 440 may be nonconductive, and a closed operating state/configuration, wherein the converter contactor 440 may be conductive. For example, the converter contactor 440 may include at least one pair of contacts which may be brought into contact with one another to establish the closed operating state and may be separated from one another to establish the open operating state. In an embodiment, the converter contactor 440 may include at least one grid-side terminal 442. The grid-side terminal(s) 442 may be energized by voltage from the electrical grid 179 in both the open and closed configurations. In an embodiment, the converter contactor 440 may also include at least one converter-side terminal 444. The converter-side terminal(s) 444 may be electrically decoupled from the electrical grid 179 when the converter contactor 440 is in an open configuration. It should be appreciated that, in an embodiment, the converter contactor 440 may be an integral component of the power converter 408.

In an embodiment, the electrical system 400 may include a filter module 446 disposed between the line-side converter 414 and the converter contactor 440 the filter module may, in an embodiment, be an AC filter configured to limit a harmonic attribute of the grid voltage. In an embodiment, the filter module 446 may include a at least one capacitor 448, at least one resistive element 450 and/or a filter fuse 452. The elements 448, 450, 452 of the filter module 446 may be configured to receive and shape the grid voltage when the converter contactor 440 is in the closed position prior to delivery to the line-side converter 414.

In an additional embodiment, the electrical system 400 may also include a distortion filter 454 positioned between the converter contactor 444 and the line-side converter 414. For example, in an embodiment, the distortion filter 454 may be an inductive element positioned in-line between the filter module 446 and the line-side converter 414. In such an embodiment, the distortion filter 454 may be configured to further shape/condition the grid voltage prior to delivery to the line-side converter 414.

Figure 3:
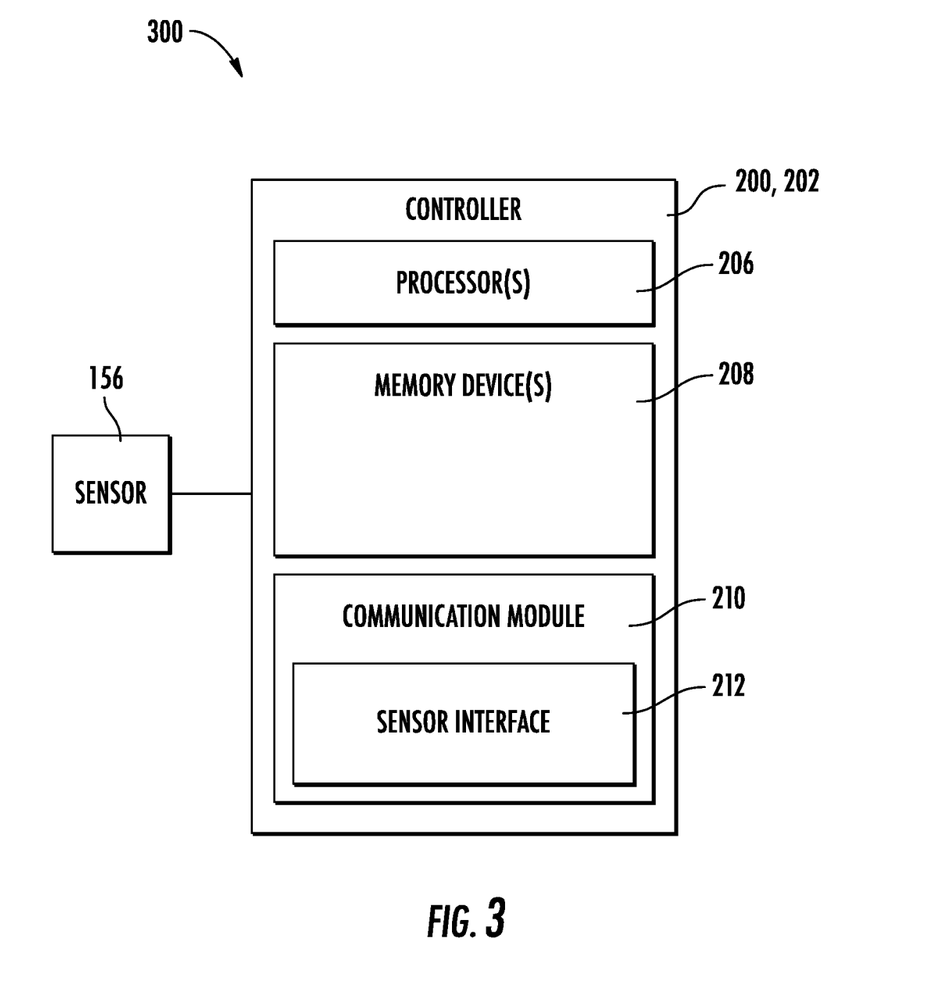
FIG. 3 illustrates a block diagram of one embodiment of a controller for use with the wind turbine according to the present disclosure.

As depicted in FIG. 3, in an embodiment, the wind turbine 100 may include at least one operational sensor 156. The operational sensor(s) 156 may be configured to detect a performance of the wind turbine 100, e.g. in response to the environmental condition. In an embodiment, the operational sensor(s) 156 may be configured to monitor a plurality of electrical conditions, such as slip, stator voltage and current, rotor voltage and current, line-side voltage and current, DC-link charge and/or any other electrical condition of the wind turbine. Additionally, the operational sensor(s) 156 may be configured to monitor a rotational speed of the rotor 108 and/or the generator rotor 404.

It should be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Figure 4:
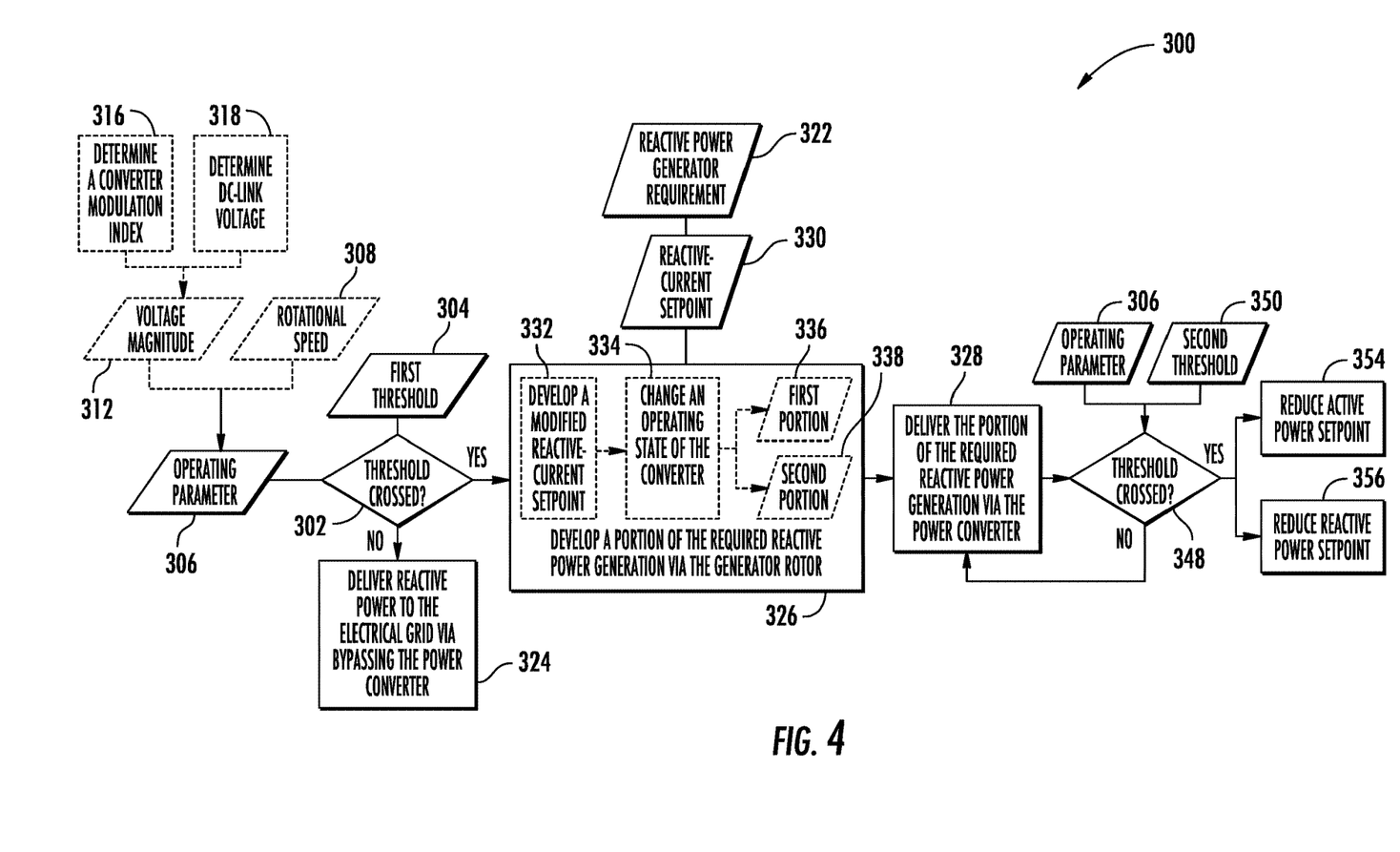
FIG. 4 illustrates a flow diagram of one embodiment of a control logic of a system for controlling the wind turbine according to the present disclosure.

Referring to FIGS. 3 and 4, multiple embodiments of a system 300 for controlling the wind turbine 100 according to the present disclosure are presented. As shown particularly in FIG. 3, a schematic diagram of one embodiment of suitable components that may be included within the system 300 is illustrated. For example, as shown, the system 300 may include the controller 200 communicatively coupled to the sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156 to be converted into signals that can be understood and processed by the processors 206. It should be appreciated that the sensor(s) 156 may be communicatively coupled to the communications module 210 using any suitable means. For example, the sensor(s) 156 may be coupled to the sensor interface 212 via a wired connection. However, in other embodiments, the sensor(s) 156 may be coupled to the sensor interface 212 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform or direct various functions including, but not limited to, developing at least a portion of a required reactive power generation via the generator rotor 404 during the speed operations of the generator 118 and delivering the portion to the electrical grid 179 via a grid side ($S_G$) of the power converter 408 as described herein, as well as various other suitable computer-implemented functions.

As depicted at 302 in FIG. 4, in an embodiment, the controller 200 of the system 300 may be configured to detect a crossing of a first threshold 304 by an operating parameter 306 of the generator rotor 404. The operating parameter 306 may be indicative of a low-speed operation of the generator 118. The low-speed operation of the generator 118 may, for example, include generator operating states wherein the generator rotor 404 has as a rotational speed 308 of less than or equal to 900 RPM when the electrical grid 179 has an operating frequency of 60 Hz. In an additional embodiment, the low-speed operation of the generator 118 may include generator operating states wherein the generator rotor 404 has a rotational speed 308 of less than or equal to 1100 RPM when the electrical grid 179 has an operating frequency of 50 Hz.

Figure 5:
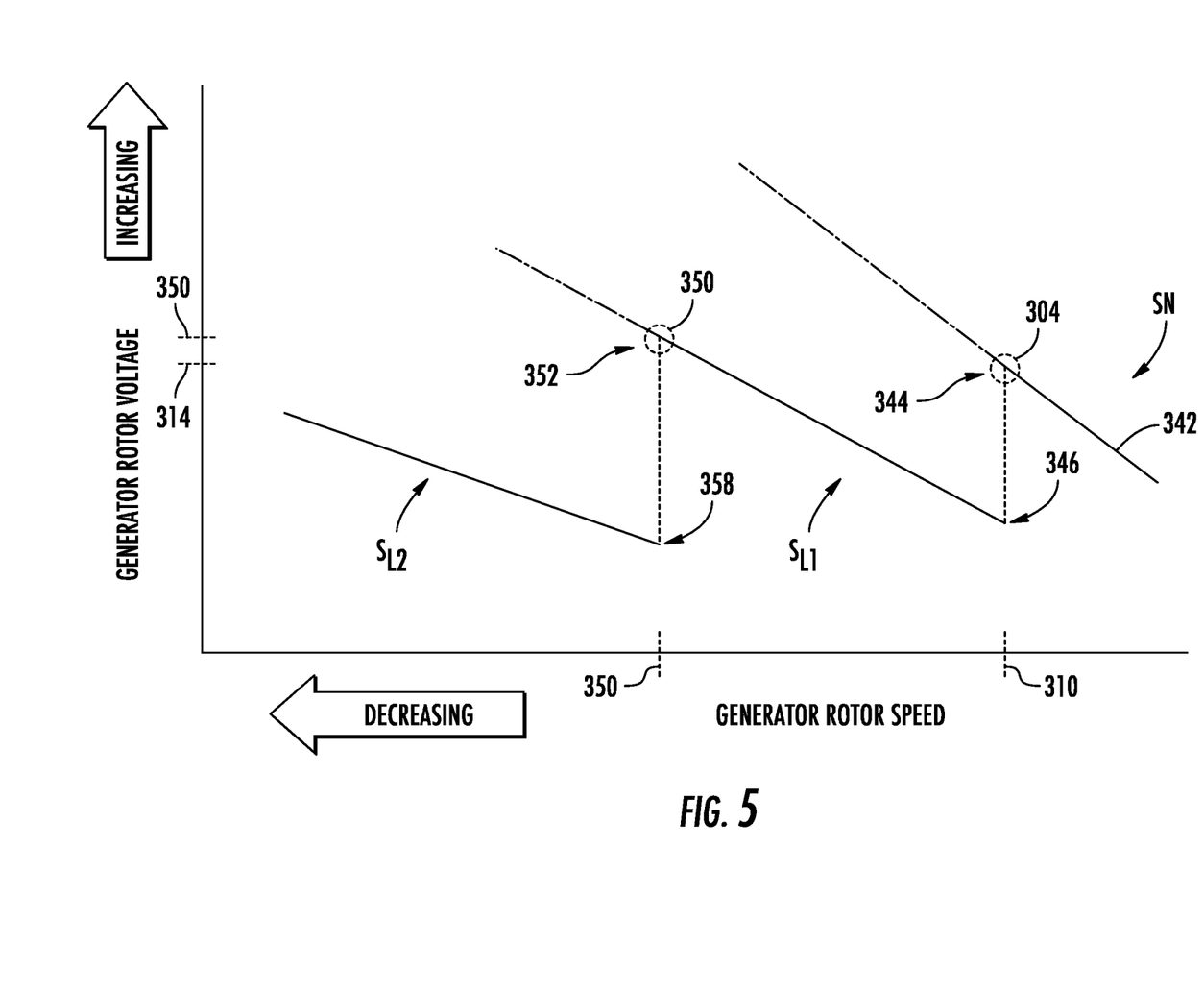
FIG. 5 illustrates a graphical plot of the relationship of generator rotor speed and generator rotor voltage according to the present disclosure.

In an embodiment, the operating parameter 306 may be the generator rotor rotational speed 308 and the first threshold 304 may be a generator rotor rotational speed threshold 310 (FIG. 5). Accordingly, the low-speed operation of the generator 118 may be indicated when the generator rotor rotational speed 308 is at or below the generator rotor rotational speed threshold 310. In such an embodiment, the crossing of the first threshold may occur when the generator rotor rotational speed 308 falls below (e.g. decreases) the generator rotor rotational speed threshold 310. It should be appreciated that the generator rotor rotational speed 308 may be obtained via direct monitoring (e.g. via the sensor(s) 156) and/or may be determined based on additional monitored parameters. For example, the generator rotor rotational speed 308 may be derived from a monitored rotational speed of the wind turbine rotor 108 (or other element coupled thereto).

In an additional embodiment, the operating parameter 306 may be a generator rotor voltage magnitude 312 and the first threshold 304 may be a generator rotor voltage threshold magnitude 314 (FIG. 5). Accordingly, the low-speed operation of the generator 118 may be indicated when the generator rotor voltage magnitude 312 is greater than (e.g. exceeds) or equal to the generator rotor voltage threshold magnitude 314. Accordingly, in an embodiment, detecting the crossing of the first threshold 304 may include receiving, via the controller, data indicative of the generator rotor voltage magnitude 312.

Receiving data indicative of the generator rotor voltage magnitude 312 may, in an embodiment, include determining a converter modulation index 316 for the rotor-side converter 412 of the power converter 408. In an additional embodiment, the generator rotor voltage magnitude 312 may be determined based on a DC-link voltage 318 for the DC link 418 of the power converter 408. It should be appreciated that the generator rotor voltage magnitude 312 may also be obtained via direct monitoring (e.g. via the sensor(s) 156).

It should be appreciated that, as depicted at 320, in an embodiment wherein the operating parameter 306 does not cross the first threshold 304, the wind turbine 100 may deliver reactive power to the electrical grid 179 via a bypassing 324 of the power converter 408. Satisfying a reactive power generation requirement 322 via the bypassing 324 of the power converter 408 may be considered to be a nominal operating state ($S_N$) (FIG. 5) of the wind turbine 100.

In response to the operating parameter 306 crossing the first threshold 304, the system 300 may, in an embodiment, develop at least a portion 326 of the required reactive power generation via the generator rotor 404. As depicted at 328, the portion 326 of the required reactive power generation may then be delivered to the electrical grid 179 via the grid side ($S_G$) of the power converter 408.

In order to develop the portion 326 of the required reactive power generation, the controller 200 may, in an embodiment, be configured to receive a reactive-current setpoint 330 for the generator 118. The reactive-current setpoint 330 may correspond to a current setpoint for the generator rotor 404 which facilitates the satisfaction of the required reactive power generation via the generator stator 402. In other words, the reactive-current setpoint 330 may be the current setpoint for the generator 118 employed when the wind turbine 100 is operating in the nominal operating state ($S_N$) and delivering reactive power to the electrical grid 179 via the bypassing 324 of the power converter 408 in order to satisfy the reactive power generation requirement 322 of the electrical grid 179. The controller 200 may then develop a modified reactive-current setpoint 332. The modified reactive-current setpoint 332 may be configured to facilitate the generation of the portion 326 of the required reactive power generation 322 via the generator rotor 404. As depicted at 334, at least one operating state of the power converter 408 may be changed based on the modified reactive-current setpoint 332. For example, in an embodiment, an operating state of at least one of the switching devices 438 may be changed based on the modified reactive-current setpoint 332 such that the current of the rotor 404 results in the portion 326 being delivered to the electrical grid 179 via the power converter 408 (e.g., via the grid side ($S_G$) of the power converter 408).

In an embodiment, changing the operating state(s) of the power converter 408 may facilitate the satisfaction of an entirety of the reactive power generation requirement 322 via the portion 326 of the required reactive power generation delivered to the electrical grid 179 via the grid side ($S_G$) of the power converter 408. In such an embodiment, all of the reactive power generated by the generator 118 may be delivered to the electrical grid 179 via the grid side ($S_G$) of the power converter 408. Accordingly, the reactive power delivered to the electrical grid 179 via the grid side ($S_G$) of the power converter 408 may constitute 100% of the reactive power generation of the wind turbine 100.

In an additional embodiment, the portion 326 of the required reactive power generation may be a first reactive power portion 336 of the required reactive power generation. In such an embodiment, changing the operating state(s) of the power converter 408 may facilitate the satisfaction of the reactive power generation requirement 322 via a reactive power output of the wind turbine 100. The reactive power output of the wind turbine 100 may include the first reactive power portion 336 delivered to the electrical grid 179 via the grid side ($S_G$) of the power converter 408 and a second reactive power portion 338 delivered to the electrical grid 179 via the bypassing 324 of the power converter 408. As such, the reactive power generation requirement 322 may be satisfied by a combination of reactive power delivered to the electrical grid 179 via the grid side ($S_G$) of the power converter 408 and delivered to the electrical grid 179 via the bypassing 324 of the power converter 408. Accordingly, the portion 326 of the required reactive power generation delivered via the grid side ($S_G$) of the power converter 408 may be less than 100% of the power generation requirement 322.

In an embodiment, delivering the portion 326 of the required reactive power generation to the electrical grid 179 via the grid side ($S_G$) of the power converter 408 may facilitate a reduction of a generator rotor voltage magnitude. For example, in the nominal operating state ($S_N$), reactive power may be delivered to the electrical grid 179 through the generator's circuit (e.g. the bypassing 324 of the power converter 408). Thus, reactive current components coming from the generator rotor 404 may flow through the generator and transformer impedances. As such, when reactive power is delivered to the electrical grid 179, the rotor voltage magnitude increases, a situation exasperated during low-speed operations due to the high generator slip. Therefore, delivering the portion 326 of the required reactive power generation via the grid side ($S_G$) of the power converter 408 may reduce the impedance encountered by the portion 326 of the required reactive power generation. This, in turn, may result in the reduction of the generator rotor voltage magnitude.

It should be appreciated that the reduction of the generator rotor voltage magnitude may also facilitate a reduction of a thermal load and/or an electrical load across at least one component of the power converter. For example, the reduction of the generator rotor voltage magnitude may reduce a required DC-link voltage 318. The reduction in the required DC-voltage 318 may reduce the electrical and/or thermal load on the rotor-side converter 412. This may, in turn, preclude a reduction in the expected lifespan of the switching devices 438 due to prolonged low-speed operations of the wind turbine 100 while satisfying the reactive power generation requirement 322.

Referring still to FIG. 4 and also to FIG. 5 wherein a graphical representation of the relationship 342 of generator rotor speed 308 and generator rotor voltage 312 is depicted. As illustrated, the wind turbine 100 may be in a nominal operating state ($S_N$) when the generator rotor speed 308 is greater than the first threshold 304. As the rotor speed decreases (moving from right to left on the graph) the generator rotor voltage magnitude 312 may increase until the first threshold 304 is reached and a first voltage magnitude 344 is obtained. Once the first operating parameter 306 crosses the first threshold 304 and the portion 326 of the required reactive power generation is delivered to the electrical grid 179 via the converter 408, the generator rotor voltage magnitude 312 may decrease, resulting in the obtaining of a second voltage magnitude 346. With the portion 326 of the required reactive power generation being delivered via the converter 408, the wind turbine 100 may be in a first low-speed operating state ($S_{L1}$).

In an embodiment, the wind turbine 100 may continue to operate (e.g. continue generating active and/or reactive current components) in the first low-speed operating state ($S_{L1}$) and the generator rotor speed 308 may continue to decrease. As such, the generator rotor voltage magnitude 312 may increase from the second voltage magnitude 346. Accordingly, following the delivery of the portion 326 of the required reactive power generation to the electrical grid 179 via the grid side ($S_G$) of the power converter 408, the controller 200 may, as depicted at 348, be configured to detect an exceeding of a second threshold 350. Similar to the first threshold 304, the second threshold 350 may correspond to a generator rotor voltage magnitude and/or generator rotor rotational speed. Upon reaching the second threshold 350, the rotor voltage magnitude 312 may have a third voltage magnitude 352.

In response to the crossing of the second threshold 350, the controller 200 may be configured to reduce an active power setpoint 354 and/or a reactive power setpoint 356. By reducing the active and/or reactive power setpoint's 354, 356, the wind turbine 100 may operate in a second low-speed operating state ($S_{L2}$). In the second low-speed operating state ($S_{L2}$), the electrical torque of the generator 118 may be significantly reduced (e.g. essentially zero) and a fourth rotor voltage magnitude 358 may be obtained. It should be appreciated that reducing the electrical torque of the generator 118 during the second low-speed operating state ($S_{L2}$) may facilitate the wind turbine 100 remaining coupled to the electrical grid 179 thereby reducing a number of connection/disconnection cycles of the converter contactor 440.

In an embodiment, the second threshold 350 may be based on a projected reliability of at least one component of the power converter 408. Therefore, reducing the active and/or reactive power setpoints 354, 356 may preclude the accumulation of a degree of wear on components of the power converter 408 during low-speed operations of the wind turbine 100.

In an additional embodiment, reducing the active and/or reactive power setpoints 354, 356 may facilitate an increase in an inertia of the rotor 108 of the wind turbine 100. For example, with the reduction in electrical torque accompanying the reduced generation requirements manifest in the active and/or reactive power setpoints 354, 356, there may be little resistance to the rotation of the rotor 108 in response to the environmental conditions acting thereon. As such, the rotational speed of the rotor 108 may increase. The resultant increase in inertia may facilitate a return to active and/or reactive power production.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling low-speed operations of a wind turbine electrically coupled to an electrical grid, the wind turbine having a generator and a power converter, the generator having a generator rotor and a generator stator, the method comprising: detecting, via a controller, a crossing of a first threshold by an operating parameter of the generator rotor, the operating parameter being indicative of a low-speed operation of the generator; in response to the operating parameter crossing the first threshold, developing at least a portion of a required reactive power generation via the generator rotor; and delivering the portion of the required reactive power generation to the electrical grid via a grid side of the power converter.

Clause 2. The method of clause 1, wherein developing the portion of the required reactive power generation comprises: receiving, via the controller, a reactive-current setpoint for the generator, the reactive-current setpoint corresponding to a current for the generator rotor which facilitates the satisfaction of the required reactive power generation via the generator stator; developing, via the controller, a modified reactive-current setpoint configured to facilitate generation of the portion of the required reactive power generation via the generator rotor; and changing at least one operating state of the power converter based on the modified reactive-current setpoint.

Clause 3. The method of any preceding clause, wherein the portion of the required reactive power generation comprises a first reactive power portion of the required reactive power generation, and wherein changing the at least one operating state of the power converter facilitates the satisfaction of the required reactive power generation via a reactive power output of the wind turbine, the reactive power output comprising the first reactive power portion delivered to the electrical grid via the grid side of the power converter and a second reactive power portion delivered to the electrical grid via a bypassing of the power converter.

Clause 4. The method of any preceding clause, wherein changing the at least one operating state of the power converter facilitates the satisfaction of an entirety of the required reactive power generation via the portion of the required reactive power generation delivered to the electrical grid via the grid side of the power converter.

Clause 5. The method of any preceding clause, wherein the operating parameter of the generator rotor comprises a generator rotor voltage magnitude, wherein the first threshold comprises a generator rotor voltage threshold magnitude indicative of the low-speed operation of the generator, and wherein detecting the crossing of the first threshold further comprises: receiving, via the controller, data indicative of the generator rotor voltage magnitude.

Clause 6. The method of any preceding clause, wherein receiving data indicative of the generator rotor voltage magnitude further comprises: determining, via the controller, a converter modulation index for a rotor-side converter of the power converter indicative of the generator rotor voltage magnitude.

Clause 7. The method of any preceding clause, wherein receiving data indicative of the generator rotor voltage magnitude further comprises: determining, via the controller, a DC-link voltage for a DC link of the power converter indicative of the generator rotor voltage magnitude.

Clause 8. The method of any preceding clause, wherein the operating parameter of the generator rotor comprises a generator rotor rotational speed, wherein the first threshold comprises a generator rotor rotational speed threshold, and wherein the low-speed operation of the generator is indicated when the generator rotor rotational speed is at or below the generator rotor rotational speed threshold.

Clause 9. The method of any preceding clause, wherein delivering the portion of the required reactive power generation to the electrical grid via the grid side of the power converter facilitates a reduction of a generator rotor voltage magnitude.

Clause 10. The method of any preceding clause, wherein the reduction of the generator rotor voltage magnitude facilitates a reduction of at least one of a thermal load and an electrical load across a component of the power converter.

Clause 11. The method of any preceding clause, further comprising: following the delivery of the portion of the required reactive power generation to the electrical grid via the grid side of the power converter, detecting, via the controller, a crossing of a second threshold by the operating parameter of the generator rotor; and reducing, via the controller, at least one of an active power setpoint and a reactive power setpoint for the generator in response to the crossing of the second threshold by the operating parameter.

Clause 12. The method of any preceding clause, wherein the second threshold is based on a projected reliability of at least one component of the power converter.

Clause 13. The method of any preceding clause, wherein the wind turbine further comprises a rotor, having one or more rotor blades mounted thereto, rotatably coupled to the generator, and wherein reducing at least one of the active power setpoint and the reactive power setpoint for the generator facilitates an increase in an inertia of the rotor of the wind turbine.

Clause 14. A system for controlling a wind turbine coupled to an electrical grid, the wind turbine having a generator and a power converter, the generator having a generator rotor and a generator stator, the system comprising a controller communicatively coupled to the generator, the controller comprising at least one processor configured to perform a plurality of operations, the plurality of operations comprising: detecting a crossing of a first threshold by an operating parameter of the generator rotor, the operating parameter being indicative of a low-speed operation of the generator; in response to the operating parameter crossing the first threshold, developing at least a portion of a required reactive power generation via the generator rotor; and delivering the portion of the required reactive power generation to the electrical grid via a grid side of the power converter.

Clause 15. The system of any preceding clause, wherein developing the portion of the required reactive power generation comprises: receiving a reactive-current setpoint for the generator, the reactive-current setpoint corresponding to a current for the generator rotor which facilitates the satisfaction of the required reactive power generation via the generator stator; developing a modified reactive-current setpoint configured to facilitate generation of the portion of the required reactive power generation via the generator rotor; and changing at least one operating state of the power converter based on the modified reactive-current setpoint.

Clause 16. The system of any preceding clause, wherein the portion of the required reactive power generation comprises a first reactive power portion of the required reactive power generation, and wherein changing the at least one operating state of the power converter facilitates the satisfaction of the required reactive power generation via a reactive power output of the wind turbine, the reactive power output comprising the first reactive power portion delivered to the electrical grid via the grid side of the power converter and a second reactive power portion delivered to the electrical grid via a bypassing of the power converter.

Clause 17. The system of any preceding clause, wherein the operating parameter of the generator rotor comprises a generator rotor voltage magnitude, wherein the first threshold comprises a generator rotor voltage threshold magnitude indicative of the low-speed operation of the generator, and wherein detecting the crossing of the first threshold further comprises: receiving data indicative of the generator rotor voltage magnitude.

Clause 18. The system of any preceding clause, wherein the operating parameter of the generator rotor comprises a generator rotor rotational speed, wherein the first threshold comprises a generator rotor rotational speed threshold, and wherein of the low-speed operation of the generator is indicated when the generator rotor rotational speed is at or below the generator rotor rotational speed threshold.

Clause 19. The system of any preceding clause, wherein delivering the portion of the required reactive power generation to the electrical grid via the grid side of the power converter facilitates a reduction of a generator rotor voltage magnitude, wherein the reduction of the generator rotor voltage magnitude facilitates a reduction of at least one of a thermal load and an electrical load across a component of the power converter.

Clause 20. The system of any preceding clause, wherein the plurality of operations further comprise: following the delivery of the portion of the required reactive power generation to the electrical grid via the grid side of the power converter, detecting a crossing of a second threshold by the operating parameter of the generator rotor; and reducing at least one of an active power setpoint and a reactive power setpoint for the generator in response to the approach of the operating parameter to the second threshold.

What is claimed is:

1. A method for controlling low-speed operations of a wind turbine electrically coupled to an electrical grid, the wind turbine having a generator and a power converter, the generator having a generator rotor and a generator stator, the method comprising:
    detecting, via a controller, a crossing of a first threshold by an operating parameter of the generator rotor, the operating parameter being indicative of a low-speed operation of the generator;
    in response to the operating parameter crossing the first threshold, developing at least a portion of a required reactive power generation via the generator rotor, wherein developing at least the portion of the required reactive power generation comprises:
        receiving, via the controller, a reactive-current setpoint for the generator, the reactive-current setpoint corresponding to a current for the generator rotor which facilitates a satisfaction of the required reactive power generation via the generator stator;
        developing, via the controller, a modified reactive-current setpoint configured to facilitate generation of at least the portion of the required reactive power generation via the generator rotor, wherein at least the portion of the required reactive power generation comprises a first reactive power portion of the required reactive power generation; and
        changing at least one operating state of the power converter based on the modified reactive-current setpoint to facilitate the satisfaction of the required reactive power generation via a reactive power output of the wind turbine, the reactive power output comprising the first reactive power portion delivered to the electrical grid via the grid side of the power converter and a second reactive power portion delivered to the electrical grid via a bypassing of the power converter; and
    delivering the portion of the required reactive power generation to the electrical grid via a grid side of the power converter.

2. The method of claim 1, wherein changing the at least one operating state of the power converter facilitates the satisfaction of an entirety of the required reactive power generation via the portion of the required reactive power generation delivered to the electrical grid via the grid side of the power converter.

3. The method of claim 1, wherein the operating parameter of the generator rotor comprises a generator rotor voltage magnitude, wherein the first threshold comprises a generator rotor voltage threshold magnitude indicative of the low-speed operation of the generator, and wherein detecting the crossing of the first threshold further comprises:
    receiving, via the controller, data indicative of the generator rotor voltage magnitude.

4. The method of claim 3, wherein receiving data indicative of the generator rotor voltage magnitude further comprises:
    determining, via the controller, a converter modulation index for a rotor-side converter of the power converter indicative of the generator rotor voltage magnitude.

5. The method of claim 3, wherein receiving data indicative of the generator rotor voltage magnitude further comprises:
    determining, via the controller, a DC-link voltage for a DC link of the power converter indicative of the generator rotor voltage magnitude.

6. The method of claim 1, wherein the operating parameter of the generator rotor comprises a generator rotor rotational speed, wherein the first threshold comprises a generator rotor rotational speed threshold, and wherein the low-speed operation of the generator is indicated when the generator rotor rotational speed is at or below the generator rotor rotational speed threshold.

7. The method of claim 1, wherein delivering the portion of the required reactive power generation to the electrical grid via the grid side of the power converter facilitates a reduction of a generator rotor voltage magnitude.

8. The method of claim 7, wherein the reduction of the generator rotor voltage magnitude facilitates a reduction of at least one of a thermal load and an electrical load across a component of the power converter.

9. The method of claim 1, further comprising:
    following the delivery of the portion of the required reactive power generation to the electrical grid via the grid side of the power converter, detecting, via the controller, a crossing of a second threshold by the operating parameter of the generator rotor; and
    reducing, via the controller, at least one of an active power setpoint and a reactive power setpoint for the generator in response to the crossing of the second threshold by the operating parameter.

10. The method of claim 9, wherein the second threshold is based on a projected reliability of at least one component of the power converter.

11. The method of claim 9, wherein the wind turbine further comprises a rotor, having one or more rotor blades mounted thereto, rotatably coupled to the generator, and wherein reducing at least one of the active power setpoint and the reactive power setpoint for the generator facilitates an increase in an inertia of the rotor of the wind turbine.

12. A system for controlling a wind turbine coupled to an electrical grid, the wind turbine having a generator and a power converter, the generator having a generator rotor and a generator stator, the system comprising a controller communicatively coupled to the generator, the controller comprising at least one processor configured to perform a plurality of operations, the plurality of operations comprising:
- detecting a crossing of a first threshold by an operating parameter of the generator rotor, the operating parameter being indicative of a low-speed operation of the generator;
- in response to the operating parameter crossing the first threshold, developing at least a portion of a required reactive power generation via the generator rotor, wherein developing at least the portion of the required reactive power generation comprises:
  - receiving, via the controller, a reactive-current setpoint for the generator, the reactive-current setpoint corresponding to a current for the generator rotor which facilitates a satisfaction of the required reactive power generation via the generator stator;
  - developing, via the controller, a modified reactive-current setpoint configured to facilitate generation of at least the portion of the required reactive power generation via the generator rotor, wherein at least the portion of the required reactive power generation comprises a first reactive power portion of the required reactive power generation; and
- changing at least one operating state of the power converter based on the modified reactive-current setpoint to facilitate the satisfaction of the required reactive power generation via a reactive power output of the wind turbine, the reactive power output comprising the first reactive power portion delivered to the electrical grid via the grid side of the power converter and a second reactive power portion delivered to the electrical grid via a bypassing of the power converter; and
- delivering the portion of the required reactive power generation to the electrical grid via a grid side of the power converter.

13. The system of claim 12, wherein the operating parameter of the generator rotor comprises a generator rotor voltage magnitude, wherein the first threshold comprises a generator rotor voltage threshold magnitude indicative of the low-speed operation of the generator, and wherein detecting the crossing of the first threshold further comprises:
- receiving data indicative of the generator rotor voltage magnitude.

14. The system of claim 12, wherein the operating parameter of the generator rotor comprises a generator rotor rotational speed, wherein the first threshold comprises a generator rotor rotational speed threshold, and wherein of the low-speed operation of the generator is indicated when the generator rotor rotational speed is at or below the generator rotor rotational speed threshold.

15. The system of claim 12, wherein delivering the portion of the required reactive power generation to the electrical grid via the grid side of the power converter facilitates a reduction of a generator rotor voltage magnitude, wherein the reduction of the generator rotor voltage magnitude facilitates a reduction of at least one of a thermal load and an electrical load across a component of the power converter.

16. The system of claim 12, wherein the plurality of operations further comprise:
- following the delivery of the portion of the required reactive power generation to the electrical grid via the grid side of the power converter, detecting a crossing of a second threshold by the operating parameter of the generator rotor; and
- reducing at least one of an active power setpoint and a reactive power setpoint for the generator in response to the approach of the operating parameter to the second threshold.

* * * * *